B. F. GREGORY AND W. H. CRAUN.
FRONT DRIVE AND STEERING WHEEL FOR AUTOMOBILES.
APPLICATION FILED SEPT. 25, 1920.
1,380,796.
Patented June 7, 1921.
2 SHEETS—SHEET 1.
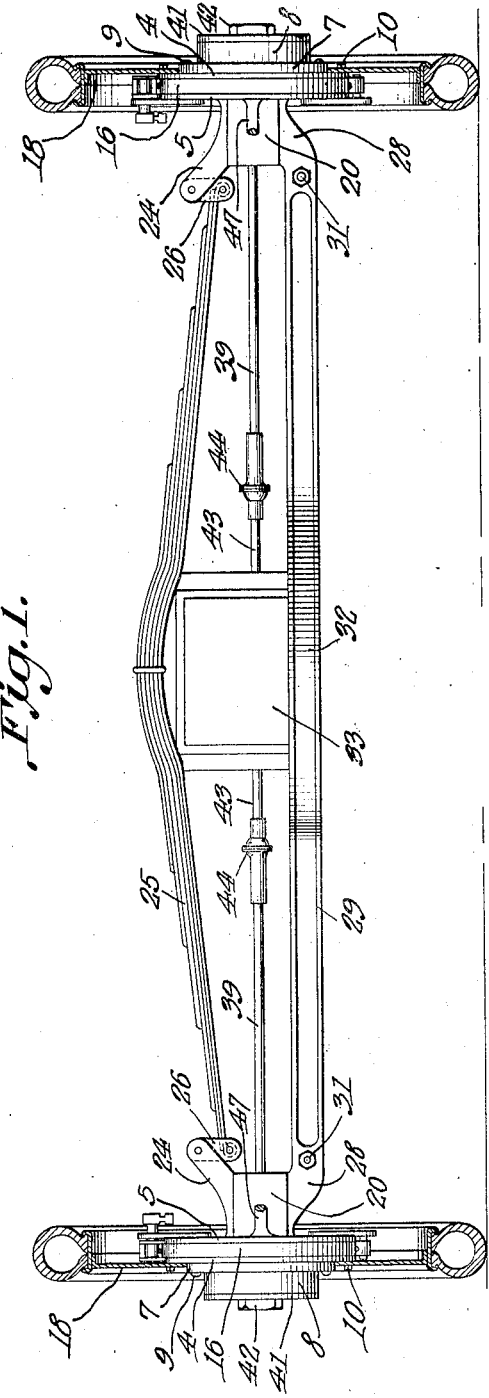
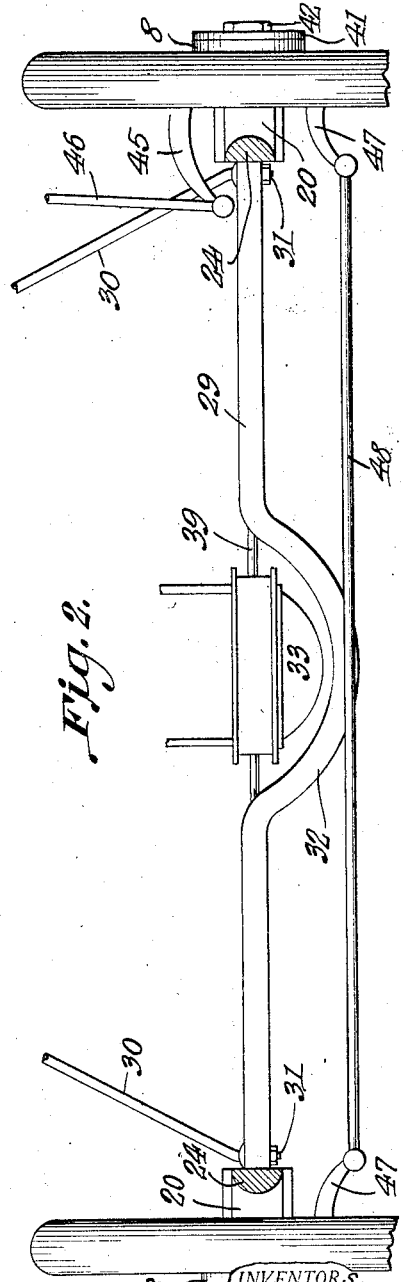
INVENTORS.
Benjamin F. Gregory
and
BY William H. Craun
C. F. Belt
ATTORNEY.

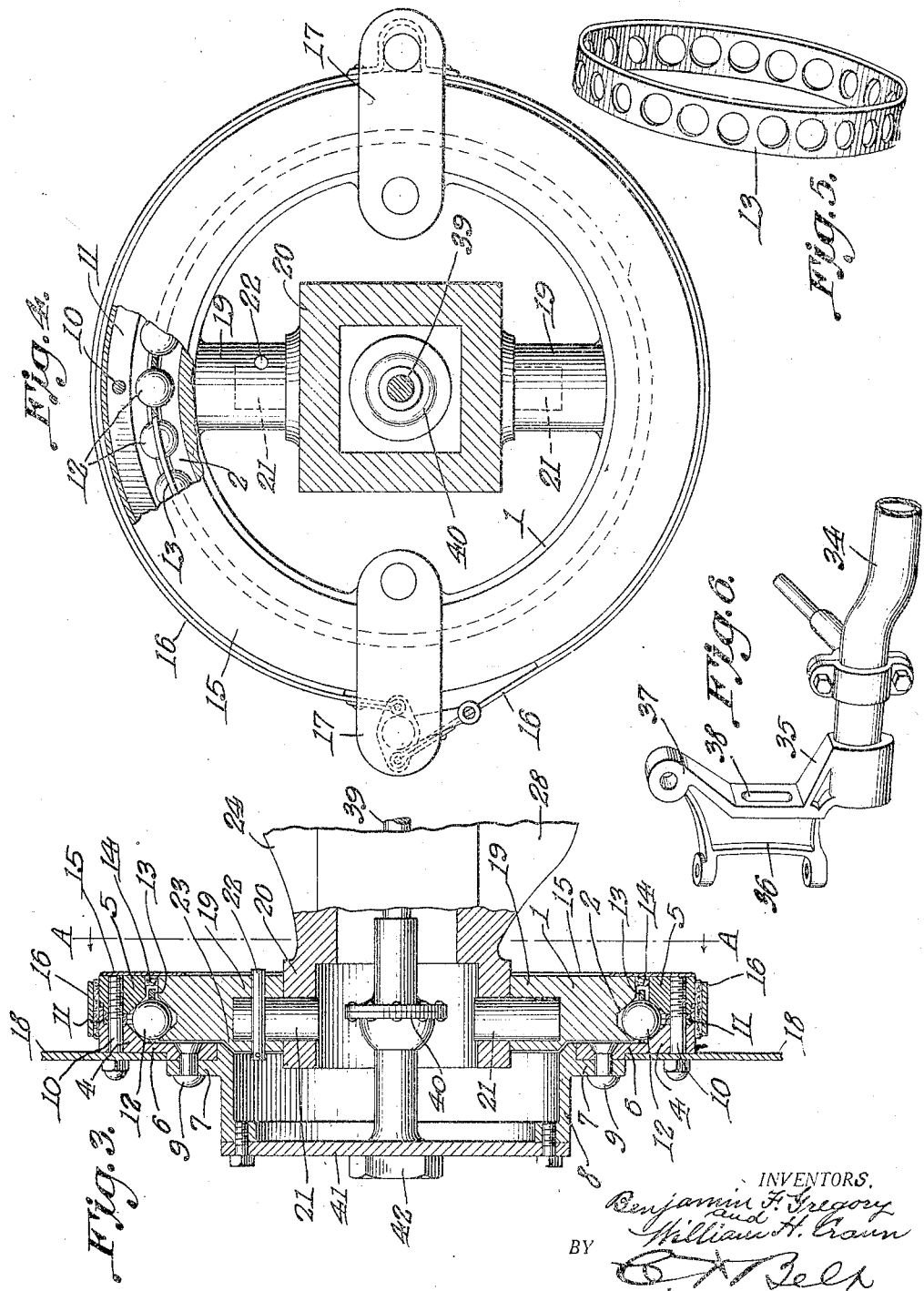

UNITED STATES PATENT OFFICE.

BENJAMIN F. GREGORY AND WILLIAM H. CRAUN, OF KANSAS CITY, MISSOURI.

FRONT DRIVE AND STEERING WHEEL FOR AUTOMOBILES.

1,380,796. Specification of Letters Patent. Patented June 7, 1921.

Application filed September 25, 1920. Serial No. 412,632.

*To all whom it may concern:*

Be it known that we, BENJAMIN F. GREGORY and WILLIAM H. CRAUN, citizens of the United States, residing at Kansas City, in the county of Jackson and State of Missouri, have invented certain new and useful Improvements in Front Drive and Steering Wheels for Automobiles, of which the following is a specification.

This invention relates to front wheel construction and axle connections for automobiles, and pertains especially to improvements in the devices covered by our application for patent filed June 16, 1919, Serial No. 304,375, allowed May 13, 1920.

The object of this invention is to provide a simplified construction of the front wheels of automobiles affording fewer parts than is employed in the wheel of our said application, and in any other such wheels known to applicants, whereby certain connections and arrangement of said parts are made to coöperate with improved results, as will be hereinafter pointed out.

A further object of the invention is to provide novel and peculiar means, forming part of the front drive wheels, for attaching a motor-supporting spring, and for attaching a rigid axle having a bowed portion permitting vertical movement of the differential.

A still further object of the invention is to provide front drive wheels for motor vehicles, having special construction and arrangement of parts specially adaptable to solid wheel webs.

A still further object of the invention is to provide in a front wheel drive for motor vehicles a steering knuckle swingable on the axle head centrally with the center of the universal drive joint of the wheel and in central line with the center of the wheel tread or tire.

Various other objects, advantages and improved results are attainable in the manufacture and practical application of the invention.

In the accompanying drawings forming part of this application:

Figure 1 is a front view illustrating the application of the invention, the wheel rims, web and tires being shown in section.

Fig. 2 is a top plan view, partly broken away.

Fig. 3 is a detail central sectional view of a front drive wheel embodying the invention.

Fig. 4 is a detail sectional elevation taken on the plane indicated by the dotted line A—A Fig. 3.

Fig. 5 is a detail view of the ball-spacing band.

Fig. 6 is a detail view of a modification.

The same reference characters denote the same parts throughout the several views of the drawings.

It has been found expedient and more desirable to make such compact assembly of the wheel drive members as to bring such members within the lateral or transverse limits of the wheel rim and tire, and to centralize such parts with respect to the center of the rim and the tire, and to omit the lower supporting spring shown in our aforesaid application and substitute therefor a rigid axle making rigid connection between projecting members of said wheels.

In accomplishing these various purposes and objects, we employ a circular or ring-shaped member 1, having a peripheral V or cone shaped circular groove 2 forming an annular bearing, and revolubly mounted on the member 1 are a pair of rings 4 and 5 each having a like undercut or beveled inner face bearing corresponding with the cone or V-shaped bearing 2. The ring 4 has an annular flange 6 fixed with an annular flange 7 of the wheel drive member 8 by means of bolts 9, and the ring 5 is connected with the ring 4 by set bolts 10 so as to leave a space between these rings for take-up plate rings or washers 11, and the rings 4 and 5 have overlapping flanges between which the take-up washers are held by the bolts 10. An annular space intervenes between the member 1 and the rings 4 and 5 for ball bearings 12 which work in a ball spacing ring 13 and have their bearing on the beveled bearing faces of the member 1 and the rings 4 and 5, and said space contains grease-packing felt 14, the inner side or face of the member 1 and rings 4 and 5 is covered by a plate ring 15, and said rings are provided with a brake band 16 connected with the member 1 by links 17. The bolts 10 also secure the wheel web 18 to the opposite side or face of the said member 1 and rings.

The member 1 which forms a steering knuckle member, has a pair of inwardly projecting posts 19 between which the axle head 20 is centrally secured by means of pivot pins 21 anchored by a removable pin 22. The posts 19 have an upper beveled portion 23 corresponding with the beveled inner periphery of the member 8, and these members are spaced apart by means of the flanges 6 and 7 and the bolts 9, so that there is no side contact of said members, and by reason of the spaces and take-up washers hereinbefore mentioned, there is no peripheral contact of the member 1 and the rings 4 and 5. In order to centralize the ball bearings of the member 1 and the rings 4 and 5, with the central line of the tread of the wheel, the said bearing or groove 2 of the member 1 is off-set from the central peripheral line of said member and the depth or width of the ring 5 in cross section is greater than that of the ring 4, so that the beveled bearing surfaces of these rings contact only with the balls 12.

The axle-heads 20 are hollow and preferably square and have arms 24 to which the end of a spring 25 is connected by links 26. A similar arm 28 is formed on and projects from the heads 20 opposite the arm 24, and these arms 28 form the ends of a rigid axle 29, and steering rods 46 are attached to the arms 45. 30 is the chassis, only disclosed fragmentarily, and 31 designates its securing nuts, these being referred to incidently, however, as they constitute no part of our invention. The axle 29 has a central off-set 32 bowed forwardly so as to permit vertical spring movement of the differential 33 through the axle 29, and this axle is used in lieu of a lower supporting spring similar to the spring 25. Preferably the axle 29 is made of an I beam and is integral with the axle head arms 28, but such axle may be tubular as shown by the modification in Fig. 6 of the drawings, wherein the ends of the tubular axle 34 are rigidly secured to an arm 35 projecting from an axle pivot bracket 36 having a spring-connecting arm 37 and a slot 38 through which the driven shaft sections or members 39 work. In the preferred form, the shaft members 39 are connected through a universal joint as 40 with the face plate 41 of the member 8 by means of the nut 42, and said shaft sections are connected with the motor or driven shaft 43 by universal joints as 44. The steering knuckle member 1 is provided with arms 47, rigidly connected together by a bracing cross rod 48.

We do not wish to be understood as limiting our invention to any particular size and material, nor in the application thereof, but reserve the right to make such changes and variations in the manufacture and assembly of the parts and in the application thereof as may not be inconsistent with the appended claims.

Having thus described our invention what we claim as new and desire to secure by Letters Patent is:—

1. In front wheels for motor vehicles, a steering knuckle-member comprising an annulus having a peripheral ball bearing groove, a plurality of annuli encompassing said steering knuckle-member and spaced off from each other and from said knuckle-member, an annulus arranged intermediate the aforesaid annuli and said knuckle-member and provided with a plurality of orifices, a plurality of spherical bearings positioned within said orifices, a compensating washer positioned intermediate the aforesaid annuli and spaced off edgewise from said plurality of spherical bearings, set-bolts passed through the aforesaid annuli and through said washer and adapted to space off said annuli to receive said washer therebetween, and means for rotatably mounting said annuli upon said steering knuckle-member.

2. In front wheels for motor vehicles, a steering knuckle member comprising a ring having a peripheral ball bearing groove, a pair of ball bearing rings surrounding the said member and spaced apart from each other and from the said member, a plurality of balls contained between said member and the rings, means arranged intermediate said pair of ball-bearing rings to compensate for wear, means coöperative with said rings to aid said compensation action, a wheel driven member secured to one of said rings, and means for adjustably connecting said rings so as to vary their bearing on the balls.

3. In front wheels for motor vehicles, a steering knuckle member having an annular ball bearing groove off-set from the peripheral center of said member, ball bearing rings encircling said member and off-set from each other and from said member on each side of the center of said groove, one of said rings having a flange plate overlapping said member without engagement, means for giving the rings relative lateral adjustment, and means for attaching said flange to a wheel drive member.

4. In front wheels for motor vehicles, a ring shaped steering knuckle member having a pair of pivot posts, an axle head fitting within the knuckle member and between the posts, pivot pins joining said head with the posts, a pair of rings encircling the knuckle member, means for connecting the rings, a wheel drive member having a flange overlapping a flange of one of said rings, and means for securing these flanges together so that the drive member will revolve the rings in the same plane with the peripheral tread of the wheel.

5. In wheels of the character described, a wheel drive member having a beveled portion upon its inner end, a steering ring member having pivot posts provided with a beveled portion fitting within said beveled portion of the drive member, a pair of rings revolubly mounted on said ring member, one of said rings having a flange attached to the drive member so as to leave a space between the drive member and said portion and between said flange and the ring member, and means for connecting said rings for unit movement.

6. In wheels of the character described, a steering ring member having an annular cone-shaped ball bearing off-set from the peripheral central plane of the ring so as to position said bearing centrally with the wheel tread, a pair of ball bearing rings connected for relative lateral adjustment and spaced apart from the periphery of said ring, a ball spacing band contained intermediate said pair of ball bearing rings, one of the rings of said pair having a flange, and a wheel drive member to which said flange is attached.

7. In a wheel of the character described, the combination of a ball bearing ring, a pair of separate ball bearing rings surrounding said ring with ball bearings therebetween, a plurality of take-up ring washers between the rings of said pair and encircling the balls in fixed position with said pair of rings, and means extending through said washers for adjustably connecting the rings of said pair.

In witness whereof we hereunto set our hands in the presence of two witnesses.

BENJAMIN F. GREGORY.
WILLIAM H. CRAUN.

Witnesses:
F. E. KEMP,
J. T. BLAKELY.